Patented Apr. 23, 1935

1,998,631

UNITED STATES PATENT OFFICE 1,998,631

FUSION PROCESS

Ernest Little, New Brunswick, N. J.

No Drawing. Application April 14, 1932,
Serial No. 605,354

17 Claims. (Cl. 71—7)

This invention relates to a process for the treatment of inorganic materials and more particularly to a process of fusing such materials with the salts of ammonia under elevated pressures.

Numerous methods have been proposed for the treatment of inorganic materials to render their firmly held values more readily usable or recoverable. For example, two general classes of processes, the wet process and the dry process, are used in metallurgy; the former being carried on in aqueous solution, and the latter involving changes and reactions at high temperatures, in the absence of moisture. Usually the dry method of treatment is preferred, if it possibly can be used, due to the fact that it lends itself more readily and is generally more economical than the wet process, especially for large commercial operations. Many ores, minerals, etc., as well as mixtures of inorganic compounds obtained in industry are not, however, capable of being decomposed, or their constituent elements separated from the whole, by dry methods heretofore known.

In order to extend the usefulness of the dry method of treating ores, minerals, mixtures of inorganic compounds, etc. it is an object of the present invention to provide an economical and efficient process therefor.

Other objects of the invention are: to provide a process whereby chemical and/or physical mixtures of metals may be rendered more easily separated; to effect the opening-up of ores or minerals by the selective solvent action of the salts of ammonia; to render possible the separation of metals from compounds thereof by the selective solvating action of a liquid, substantially anhydrous, ammonium salt; and to effect the decomposition of ores, rock, or other natural or industrial, chemical or mechanical mixture of metals or their compounds by fusion with a liquid, substantially anhydrous, salt of ammonia under elevated pressure. Other objects will hereinafter appear.

I have found that by fusing inorganic compounds containing one or more metals with a liquid salt of ammonia and at elevated temperatures and pressures, the compound may be decomposed and the metals, as chemical compounds, may be easily and thoroughly separated. Furthermore, in the treatment of some materials of this nature it may be desired to merely alter the solubility characteristics of one or more of the metal constituents of the compound being treated. I have found that this also can be accomplished, according to my invention, by pressure fusion with a salt of ammonia.

The salts of ammonia, which according to my invention may be used, include, for example, the halides of ammonia, viz. ammonium chloride, iodide, bromide, and fluoride; the sulfate, and in some instances, the nitrate may be employed. The salt to be used will, in each instance, be determined by the material to be fused therewith. For example, if a phosphate rock is to be treated, to increase its water soluble $P_2O_5$ content, ammonium carbonate and/or ammonium sulfate may be used. To separate metals from their ores the halides are generally more suitable, although the sulfate and/or carbonate have many applications. The method of determining the specific salt to be employed will be more fully described hereinafter.

In order that those skilled in this art may more readily understand my invention, I will now describe several examples illustrating its use, but it will be understood that I am not to be limited by the details therein given.

Example 1—One hundred parts by weight of phosphate rock, after being crushed to approximately 100 mesh, are admixed with 500 parts by weight of substantially anhydrous ammonium carbonate. The resulting mixture is placed in a closed vessel capable of withstanding elevated pressures and temperatures. The mixture is heated until the ammonium carbonate is liquefied and at a temperature of approximately 150–200° C. and under the pressure developed the fusion of the liquid ammonium carbonate with the phosphate rock begins. The temperature is held somewhat above 250° C. until complete fusion has been effected. The vessel is then allowed to cool and the fused mass is separated. The fusion is then heated to remove the ammonia and the free carbon dioxide; both, of course, may be recovered, if desired, by employing well known absorption methods. A phosphate rock treated by this process and having an initial $P_2O_5$ content of 32% gave a product having a $P_2O_5$ water and citrate solubility of 24%.

Example 2—By carrying out the above process but employing 5 parts by weight of a 50/50 mixture of ammonium carbonate and ammonium sulfate, in lieu of the 5 parts of ammonium carbonate per part of the rock treated in Example 1, a phosphate rock having an initial $P_2O_5$ content of 32% was converted to one giving a $P_2O_5$ citrate and water solubility of 28%.

Example 3—The dust from smelters containing iron, lead, zinc, silver, arsenic, and copper is thoroughly mixed with approximately four times its weight of ammonium chloride, and the mixture heated in a closed pressure-resisting vessel to a temperature of approximately 250° C. and held at this temperature, and under the pressure developed, until complete fusion is effected. After cooling the fused mass is heated to remove the excess ammonium chloride and to volatilize the arsenic. The water soluble metal chlorides of zinc, iron, and copper are now easily separated by leaching with water from the water insoluble metal chlorides of lead and silver.

*Example 4*—Dried stephanite or brittle silver ($Ag_5SbS_4$) is thoroughly mixed with an excess of ammonium bromide and the mixture fused under pressure at a temperature of 200° C. or above. The resulting fusion, after cooling and reheating, at atmospheric pressure, to drive off the ammonia and open up the fused mass, is leached with hydrochloric acid to separate the antimony bromide, which is soluble in this acid, from the insoluble silver bromide.

Any specific metal, such, for example, as those contained in the metal compounds of Examples 3 and 4, or like compounds, may be readily rendered soluble by treatment with the ammonium salt, which will give after fusion under pressure a metal having the solubility desired. Subsequent to the fusion step the removal of the fused-in ammonium salt opens up the mass which is then leached with the proper solvent. A skilled chemist or metallurgist will realize the extensive applications of this process and the ease with which one can, after knowing the chemical composition of the material to be treated, so convert it chemically, by my fusion process, as to render an individual constituent or constituents readily separable from the whole. For instance, he can accomplish this by reference to a solubility chart from which he determines the relative solubilities, in suitable solvents, of the metals contained in the ore, and accordingly decides on the use of that salt of ammonia the anion of which, when combined by means of my pressure fusion process to the metals, will enable him to separate the metals (as salts) by a simple leaching process. It, of course, is immaterial which of the metals is rendered soluble, or if two or more fusions are employed with the same or different ammonium salts, with or without a leaching step, using the same or different solvents, after each fusion step—such processes will come, whichever combination of steps be used, within the scope of this invention.

The ammonia may be driven from the treated material by a separate heating operation as described in the example or the vessel in which the reaction is conducted may be provided with a suitable outlet valve and the pressure released before the temperature of the fused mass falls below the decomposition temperature of the ammonium salt used. In some instances, it may be found satisfactory to conduct the fusion under comparatively low pressures, say within the range of 20-50 atmospheres. This may be easily accomplished by carrying out the fusion in a vessel provided with a pressure release valve which automatically maintains the pressure at the desired amount. For the treatment of materials difficult to "open-up", higher pressures are generally preferred.

The chemical action resulting from the fusion is by no means the only important advantage resulting from my invention. The pressures developed are of such magnitude that thorough fusion of the whole mass is effected with surprising rapidity. The whole mass is permeated with the ammonium salt as a result of the pressure. Consequently, when the pressure is released, at a temperature above the decomposition temperature of the ammonium salt, there is a substantially instantaneous mechanical disruption of the material treated. The force of this disruption opens up the material so that the leaching operation is greatly facilitated. It is often of advantage to treat materials, according to my process, merely to gain the advantages obtained by this desirable "opening-up" action; ammonium carbonate is generally preferred for this purpose.

The pressures developed during the heating operation are very high if a hermetically sealed vessel is used. If vessels are used which will withstand pressures of but 15-20 atmospheres, good results can be obtained by conducting the fusions under such pressures, although the higher pressures in the neighborhood of 100-150 atmospheres or over, and in some instances even as high as 500 atmospheres, are desirable for the treatment of ores very difficult to "open-up".

From a consideration of the above specification it will be realized that any modification of the above fusion process will come within the scope of this invention without sacrificing any of the advantages that may be derived therefrom.

I claim:

1. A process for opening-up inorganic materials of natural or industrial origin such as ore, rock, chemical or mechanical mixtures of metals and their compounds which contain recoverable values which comprises heating the material with a substantially anhydrous salt of ammonia at a pressure in excess of 15 atmospheres and to a temperature at least sufficiently high to insure liquefaction of the ammonium salts.

2. A process for opening-up inorganic materials of natural or industrial origin such as ore, rock, chemical or mechanical mixtures of metals and their compounds which contain recoverable values which comprises heating the material with a salt of ammonia at super-atmospheric pressure of at least 15 atmospheres and to a temperature at least sufficiently high to insure liquefaction of the ammonium salts.

3. A process for opening-up inorganic materials of natural or industrial origin such as ore, rock, chemical or mechanical mixtures of metals and their compounds which contain recoverable values which comprises heating the material with liquid substantially anhydrous ammonium carbonate.

4. A process for opening-up inorganic materials of natural or industrial origin such as ore, rock, chemical or mechanical mixtures of metals and their compounds which contain recoverable values which comprises heating the material with liquid substantially anhydrous ammonium sulfate at a pressure of from 20 to 50 atmospheres.

5. A process for opening-up inorganic materials of natural or industrial origin such as ore, rock, chemical or mechanical mixtures of metals and their compounds which contain recoverable values which comprises heating the material with liquid substantially anhydrous ammonium halide at a pressure of at least 15 atmospheres.

6. A process of opening-up phosphate rock which comprises heating the rock with liquid substantially anhydrous ammonium carbonate under superatmospheric pressure.

7. A process for the treatment of inorganic materials containing recoverable values which comprises subjecting them to the selective solubilizing action of a liquid substantially anhydrous salt of ammonia at a pressure of from 20 to 500 atmospheres.

8. In a process for the treatment of inorganic materials of a natural or industrial origin, such as ore, rock, chemical or mechanical mixtures of metals and their compounds to open up the materials and thereby rendering their contained values readily recoverable, the step which comprises heating the material with a liquid, substantially anhydrous, salt of ammonia under a pressure of at least 15 atmospheres and subsequently releasing the pressure at a temperature above the decomposition temperature of the salt.

9. In a process for the opening up of inorganic materials of natural or industrial origin, such as ore, rock, chemical or mechanical mixtures of metals and their compounds which contain recoverable values, the steps which comprise heating the material under a pressure of at least 15 atmospheres with a substantially anhydrous ammonia salt, the anion of which renders a portion of the values held by the material soluble, dissolving out the solubilized portion of the values, heating the residual materials with a substantially anhydrous ammonia salt containing a different anion to render another portion of the values soluble, dissolving out the thus solubilized portion, and further treating the materials for the recovering of the remaining values, the heating with the ammonium salts being conducted at a temperature at least sufficiently high to insure liquefaction of the ammonium salt.

10. A process for treating an inorganic material containing recoverable values which comprises heating the material with a substantially anhydrous salt of ammonia to a temperature at least sufficiently high to insure liquefaction of the salt, and at a pressure of 20–500 atmospheres, thereby opening up the materials and subsequently extracting the thus opened up materials.

11. A process for the opening up of inorganic material of a natural or industrial origin, such as ore, rock, chemical and mechanical mixtures of metals and their compounds containing recoverable values, which comprises heating the material under superatmospheric pressure with a liquid substantially anhydrous salt of ammonia which is decomposable under normal pressure and moderately elevated temperature, and subsequently releasing the pressure at a temperature above decomposition temperature of the salt.

12. The process of claim 11 characterized in that the liquid salt is substantially anhydrous ammonium carbonate.

13. The process of claim 11 characterized in that the liquid salt is substantially anhydrous ammonium sulfate.

14. The process of claim 11 characterized in that the liquid salt is substantially anhydrous ammonium halide.

15. In a process of opening up phosphate rock to render its values readily recoverable the steps which comprise heating the rock with a liquid, substantially anhydrous salt of ammonia under a pressure of at least 15-atmospheres, and subsequently releasing the pressure at a temperature above the decomposition temperature of the anhydrous salt of ammonia.

16. In a process of opening up phosphate rock to render its values readily recoverable the steps which comprise heating the rock with liquid substantially anhydrous ammonium carbonate, under a pressure of at least 15 atmospheres and subsequently releasing the pressure at a temperature above the decomposition temperature of the anhydrous ammonium carbonate.

17. In a process of opening up phosphate rock to render its values readily recoverable the steps which comprise heating the rock with liquid substantially anhydrous ammonium sulphate, under a pressure of at least 15 atmospheres and subsequently releasing the pressure at a temperature above the decomposition temperature of the anhydrous ammonium sulfate.

ERNEST LITTLE.